United States Patent [19]

Bedinghaus

[11] 4,157,626
[45] Jun. 12, 1979

[54] MAPS AND CHARTS HOLDER

[76] Inventor: W. H. Bedinghaus, 4930 62nd Ave. S., St. Petersburg, Fla. 33715

[21] Appl. No.: 818,109

[22] Filed: Jul. 22, 1977

[51] Int. Cl.² ............................................. G09F 11/29
[52] U.S. Cl. ................................... 40/518; 33/DIG. 1;
33/431; 35/62; 40/904; 281/45
[58] Field of Search .................. 40/518, 904, 489–491,
40/10 R, 10 A, 10 B, 16, 16.2, 16.4, 618, 361;
281/45; 35/40, 62; 235/89 R, 85, 70 A, 71 R, 71
A; 33/DIG. 1, 107, 76 R

[56] References Cited

U.S. PATENT DOCUMENTS

| 1,664,511 | 4/1928 | Isbell ...................................... 40/518 |
| 1,729,480 | 9/1929 | Hale ................................. 40/518 UX |
| 1,797,647 | 3/1931 | Gayer .............................. 40/518 X |
| 2,586,039 | 2/1952 | Heggedal ........................... 40/618 X |
| 2,659,991 | 11/1953 | Strayer .............................. 40/16.4 |
| 3,193,195 | 6/1965 | Jeffries, Jr. ........................ 235/71 R |
| 3,387,397 | 6/1968 | Buchanan ............................ 40/10 R |

FOREIGN PATENT DOCUMENTS

| 81676 | 8/1956 | Denmark ................................... 40/518 |
| 461946 | 2/1937 | United Kingdom ....................... 40/361 |
| 511302 | 8/1939 | United Kingdom ....................... 40/518 |
| 951541 | 3/1964 | United Kingdom ....................... 40/518 |

*Primary Examiner*—John F. Pitrelli
*Assistant Examiner*—G. Lee Skillington
*Attorney, Agent, or Firm*—Stein & Frijouf

[57] ABSTRACT

A document protecting device for holding a flexible document is disclosed comprising a first and a second member each having a transparent substantially planar central region interposed between end regions. Each of the end regions includes a protrusion entending outwardly relative to the planar central region. The first member is mounted relative to the second member with the protrusions defining end containers for receiving rolled portions of the flexible document with the planar central regions protecting an intermediate portion of the flexible document. The first and second members may be slideably mounted relative to one another for exposing a portion of the flexible document for making notations thereon. The first and second members may be substantially identical to one another with each of the members having a groove on one end thereof and a slide on the other end thereof. The first and second members are slideably secured to one another with the slides in the first and second members cooperating with the groove in the other of the first and second members. The foregoing abstract is merely a resume of one general application, is not a complete discussion of all principles of operation or applications, and is not intended to be construed as a limitation on the scope of the claimed subject matter.

17 Claims, 9 Drawing Figures

MAPS AND CHARTS HOLDER

BACKGROUND OF THE INVENTION

1. Field of the Invention p This invention relates to books, stripes and leaves and more particularly to book or leaf holders for holding a flexible document.

2. Description of the Prior Art

Various devices have been devised for holding a document which enables visual inspection of the document when the document is secured to the holding device. Springboards, clipboards and various variations thereof have been known to the prior art for a number of years. To further aid the protection of the document, some in the prior art have used a substantially transparent material to overlay the document while the document was secured to the springboard or clipboard. Others in the prior art have developed transparent containers for protecting the document while enabling visual inspection thereof. These containers have been made of rigid and flexible plastic materials with various types of closures for securing the document within the container.

For a number of reasons, the aforementioned containers have not found widespread use in the art. In general, these devices were constructed of a number of parts which required assembly to produce the container device. A further disadvantage of these prior art devices was the lack of means for enabling the observer to make notations on the surface of the document while simultaneously providing a writing surface for the notation. In most of the prior art devices, the document would have to be entirely removed or exposed from the holding device and placed on a writing surface in order to make notations. The document would then be reinserted into the holder. In many applications such as an open cockpit of a marine craft, the document could be damaged by water spray while the document was removed from the container. Finally, these prior art devices did not provide means for enabling the visual inspection of both sides of the document contained therein.

Therefore it is an object of this invention to provide an apparatus which overcomes the aforementioned inadequacies of the prior art devices and provides an improvement which is a significant contribution to the advancement of the document art.

Another object of this invention is to provide a device for holding a flexible document comprising a first and a second member each having a substantially planar central region interposed between end regions with the end regions forming end containers for receiving rolled portions of the flexible document while the planar central region protects an intermediate portion of the flexible document.

Another object of this invention is to provide a device for holding a flexible document wherein the first and second members are slideably mounted relative to one another for allowing access to either side of the document for making notations thereon while simultaneously providing a writing surface for the notations.

Another object of this invention is to provide a device for holding a flexible document comprising a planar slide in one end of the first and second members and a groove cooperable with the slides in the other end of the first and second members for slideably mounting the first and second members relative to one another.

Another object of this invention is to provide a device for holding a flexible document wherein each of the first and second members is a unitary transparent plastic structure substantially identical to one another with a groove at one end thereof and a slide at the other end thereof with the grooves being cooperable with the slides for slideably mounting the first member relative to the second member.

Another object of this invention is to provide a device for holding a flexible document having open cylindrical end containers for enabling rotation of the rolled portion of the flexible document to index the flexible document relative to the polar planar central region of the device.

Another object of this invention is to provide a device for holding a flexible document with a first and a second logarithmic scale on the first and second members respectively for enabling slide rule calculations upon movement of the first member relative to the second member.

Another object of this invention is to provide a device for holding a flexible document in combination with the transparent plastic compass dial or a distance scale which may be secured to either one of the first or second members by electrostatic atttraction.

Other objects and a fuller understanding of this invention may be had by referring to the summary of the invention, the description and the claims, taken in conjunction with the accompanying drawings.

SUMMARY OF THE INVENTION

The invention may be incorporated into a device for holding a flexible document comprising a first and a second member each having a central region interposed between end regions. Each of the end regions includes a protrusion extending outwardly relative to the central region. The central region of the first and second members are transparent for enabling visual inspection of the flexible document therethrough. Mounting means are provided for mounting the first member relative to the second member with the protrusions defining end containers for receiving rolled portions of the flexible document and with the central regions protecting the intermediate portions of the flexible document while enabling visual inspection thereof.

In one embodiment, the first and second members are slideably mounted relative to one another with the movement of the first member relative to the second member exposing a first side of the flexible document for marking thereon while the second member provides a work surface for the flexible document. Movement of the second member relative to the first member exposes a second side of the flexible document for marking thereon while the first member provides a work working surface for the flexible document. The mounting means for the first and second members may include an end slide in one of the first and second members cooperating with a groove in the other of the first and second members. In one embodiment, the first member includes two-end slides adjacent to the protrusions and on opposite sides from the central region of the first member. The second member includes grooves established on the end regions of the second member for cooperation with the slides of the first member. In this embodiment, the grooves are established to face the protrusions of the first and second members.

In another example, the first and second members are substantially identical to one another with each member having a slide on one end region adjacent the protrusion and on the opposite side from the central region. Each of the first and second members has a groove on the other end region cooperable with the slide of the other member for mounting the first and second members to one another. In this embodiment, each of the members is a unitary transparent plastic structure formed from the same mold thus saving a substantial amount in tooling. The groove of the first and second members may be substantially perpendicular to the major component of the central planar region.

The protrusions in the first and second members may be semi-cylindrical thus establishing substantially cylindrical end containers upon cooperation of the first and second members. The end containers may have open cylindrical ends for rotating the rolled portions to index the flexible document relative to the central region.

A first and a second logarithmic scale may be scribed or otherwise mounted on the first and second members respectively. Linear movement between the first and second members enables the first and second logarithmic scales to operate as a slide rule for speed, distance and time calculations. A transparent plastic indicator may be secured to one of the first and second members by means such as electrostatic traction. For example, a transparent plastic compass dial indicated may be mounted and aligned with the compass star on the flexible document. In the alternative, the transparent plastic indicator means may be a transparent plastic scale for measuring distance and the like.

The first and second members formed are substantially cylindrical containers for receiving the rolled portions of the flexible document. Accordingly, the internal diameter of the cylindrical containers retain the rolled portion of the flexible documents. The document may be indexed by rotating the rolled portion of the document within the cylindrical container. This invention has eliminated the need for complex spools and other indexing mechanisms known in the art for generations.

This invention accordingly comprises an apparatus possessing the features, properties and the relation of elements which will be exemplified in the article hereinafter described, and the scope of the invention will be indicated in the claims.

BRIEF DECRIPTION OF THE DRAWINGS

For a fuller understanding of the nature and objects of the invention, reference should be had to the following detailed description taken in connection with the accompanying drawings in which.

Similar references characters refer to similar parts throughout the several views of the drawings.

DETAILED DESCRIPTION

Figure 1:
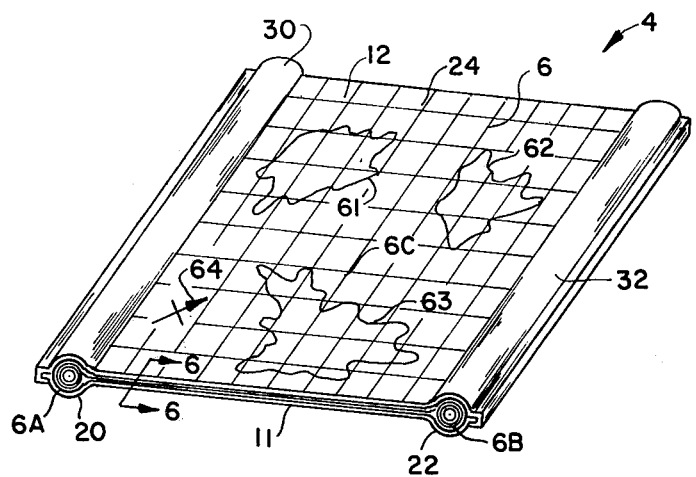
FIG. 1 is an elevational view of a first embodiment of a device for holding a flexible document shown as a nautical map or chart.

FIGS. 1-9 illustrate various views of a first embodiment of a device 4 for holding a flexible document 6 shown as a nautical chart or map. The device 4 includes a first and a second member 11 and 12 shown as substantially transparent plastic members. The first member 11 has a substantially planar region 14 interposed between end regions 16 and 18. The end regions 16 and 18 of the first member 11 include protrusions 20 and 22 extending outwardly relative to the substantially planar central region 14. Similarly, the second member 12 comprises a planar region 24 interposed between end regions 26 and 28 having protrusions 30 and 32 respectively. The first and second members 11 and 12 are shown slideably mounted relative to one another with the protrusions 20 and 30 defining a substantially cylindrical end container 34 for receiving a rolled portion 6A of document 6. Similarly, protrusions 22 and 32 define a substantially cylindrical container 36 for receiving a second rolled portion 6B of the flexible document 6. An intermediate portion 6C of the document 6 is protected by the central planar regions 14 and 24 of the first and second members 11 and 12.

Figure 4:
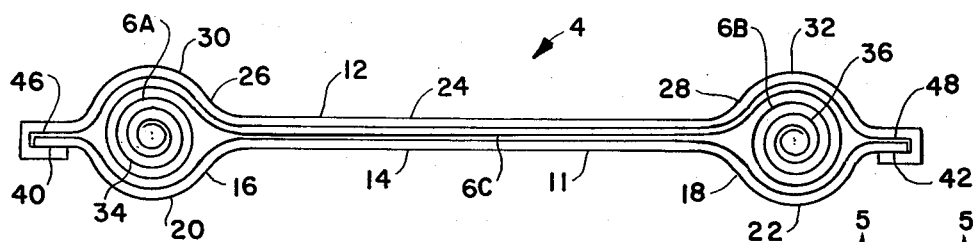
FIG. 4 is an end view of the invention shown in FIGS. 1-3.

FIG. 4 shows in greater detail the means for slideably mounting the first member 11 relative to the second member 12. The end region 16 and 18 of the first member 11 include end planar regions 40 and 42 adjacent the protrusions 20 and 22 and on the opposite side from the planar central region 14. The second member 12 comprises grooves 46 and 48 on the end regions 26 and 28 of the second member 12. The grooves 46 and 48 are located on the opposite sides of the protrusions 30 and 32 from the planar central region 24 with the grooves 46 and 48 facing protrusions 30 and 32 respectively. In this embodiment, the grooves 46 and 48 are formed by folding over a portion of the end regions 26 and 28. It should be understood that numerous configurations may slideably mount the first member 11 relative to the second member 12.

Figure 6:
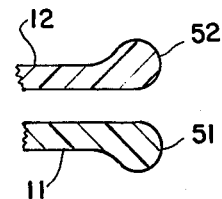
FIG. 6 is a partial sectional view along line 6—6 of FIG. 1.

FIG. 6 is a sectional view along line 6—6 in FIG. 1 showing in greater detail the end regions of the first and second members 11 and 12. Each of the members has a round terminating surface 51 and 52 respectively for facilitating insertion of the map therein as will be hereinafter described.

In general, there are two types of nautical charts which may be referred to as type A and type B. Type A charts are less than 16 inches wide but very long with information printed on both sides. Type B charts are wider, approximately 30 inches and printed on one side only. Although the invention will be described by way of example for A and B Type nautical chart or map, it is understood that the invention is not to be limited to this application.

For inserting the type A chart, the chart is tightly rolled in two rolls and inserted through edges 51 and 52 such that the rolled portion 6A and 6B are inserted into the cylindrical containers 34 and 36. For the type B maps, the chart is cut in half along the length. The two pieces of the chart are taped back to back at one end. The chart can then be rolled into two rolled portions 6A and 6B for insertion within the device 4.

FIG. 1 illustrates the device 4 protecting the chart 6 in the normal position. It should be appreciated from FIG. 4 that both the front and back portion of the document 6 may be viewed through the transparent planar central regions 14 and 24. The chart 6 includes three areas 61–63 which may be representative of islands on a nautical chart. The chart also includes a direction heading shown as an arrow 64.

Figure 2:
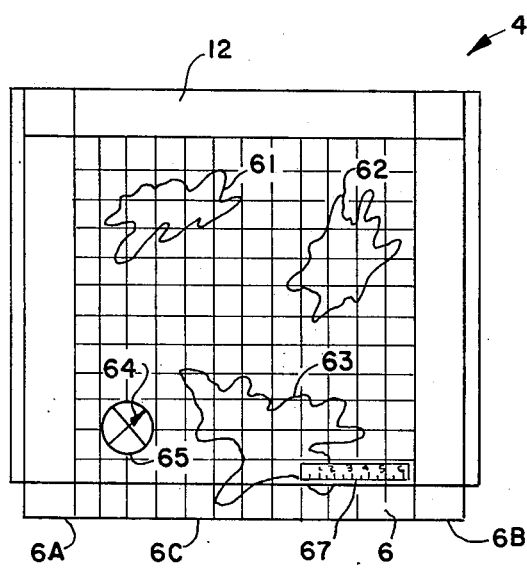
FIG. 2 is a top elevational view of the device shown in FIG. 1 with the chart extending from the device to index the chart relative to the device.
Figure 3:
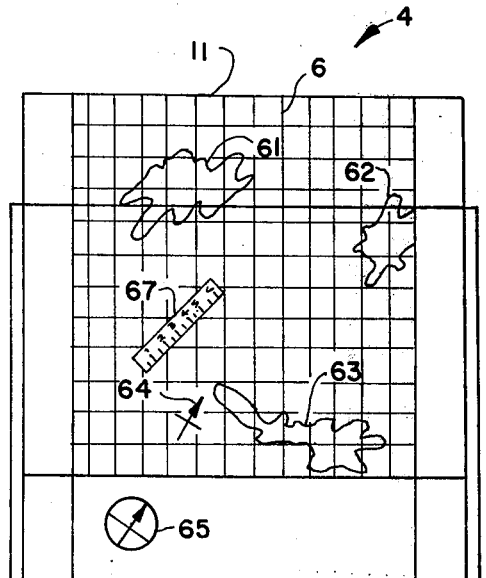
FIG. 3 is a top elevational view of the device shown in FIGS. 1 and 2 wherein the first member is displaced relative to the chart and the second member for making a notation upon the chart.

FIG. 2 shows the chart 6 being slightly withdrawn from the protective device 4. To index the chart, the operator merely rotates one of the rolled portions 6A and 6B between the thumb and index finger. Rotation of portion 6B in a clockwise direction in FIG. 4 results in the chart 6 being displaced toward the right as shown in FIG. 3. The chart portions 6A and 6B are retained by the internal diameters of cylindrical container 34 and 36. Accordingly, internal spindles or spools are not needed for indexing or containing the document 6.

FIG. 3 also illustrates the movement of the second member 12 relative to the first member 11 and relative to chart 6. In this arrangement, notations can be made on the surface of the chart 6 with the first member 11 functioning as a work surface for the notation. Movement of the first member 11 relative to the second member 12 and the chart 6 enables notation on the opposite side of the chart 6 with the second surface 12 operating as a work surface. Markings can also be made on the external plastic surface by a grease pencil or the like.

The invention also may include securable indicator means shown as a transparent plastic compass heading 65 or a transparent plastic linear distance indicator 67. The transparent indicator is made of a material such as "electrostatic vinyl" which has the property of adhering to surfaces, preferably plastic surfaces, whether the surface is wet or dry. This material adheres by electrostatic attraction. FIG. 2 illustrates the compass indicator 65 being superimposed over the chart heading 64 for permanently recording the bearing of the chart 6. Upon indexing of the chart 6 as shown in FIG. 3, compass indicator 65 remains parallel to the chart heading 64. The distance measurement linear scale 67 may be similarly moved to determine distances between pertinent points on the chart 6. The distance measuring scale 67 may include plural scales in accordance with different conventional scales used on most charts.

Figure 5:
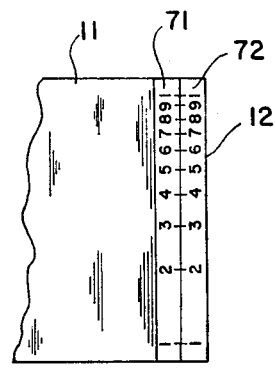
FIG. 5 is a view along line 5—5 in FIG. 4 showing logarithmic scale on the first and second members.

FIG. 5 shows a first and a second logarithmic scale 71 and 72 respectively printed, engraved or otherwise mounted on the first and second members 11 and 12. The logarithmic scales extend from 1 to 10 in a common logarithmical relationship. Sliding the first member 11 relative to the second member 12 enables the operator to use the two logarithmic scales 71 and 72 as a slide rule. Distance, velocity and time computations may be solved through multiplication and division on the integral slide rule. The slide rule, in conjunction with the compass indicator 65 and the linear distance measuring scale 67 provides the necessary tools for navigational calculations.

Figure 7:
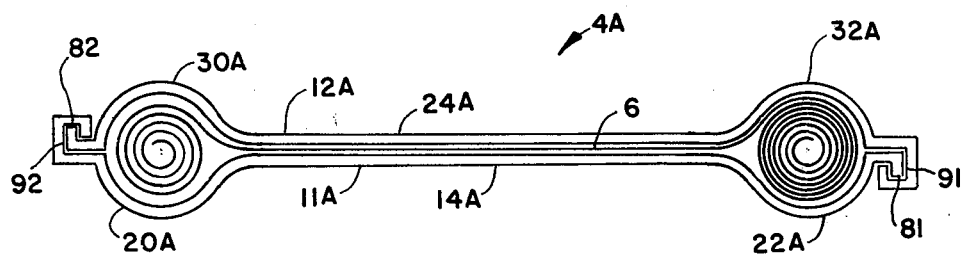
FIG. 7 is a variation of the mounting means for securing the first member relative to the second member.
Figure 8:
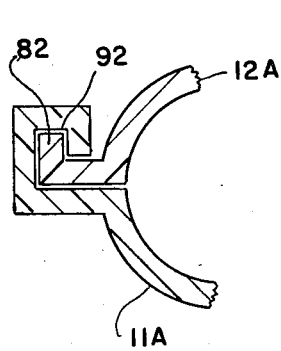
FIG. 8 is a partial magnified view of the mounting means securing the first member relative to the second member as shown in FIG. 7.

FIGS. 7 and 8 show a second embodiment of the device 4A. In this embodiment, the first and second members 11A and 12A are identical to one another. The first and second members 11A and 12A include slides 81 and 82 on one end of each of the first and second members 11A and 12A. Each slide is established substantially perpendicular to the major component of the planar central regions 14A and 24A. Grooves 91 and 92 are established on the other end of the first and second member 11A and 12A. The grooves 91 and 92 receive slides 81 and 82 for slidably mounting the first member 11A relative to the second member 12A. Since the first and second members 11A and 12A are identical, they may be fashioned from the same die, thus saving tooling cost. The identical parts need only be positioned 180° relative to one another for providing the slidable cooperation as set forth in FIGS. 7 and 8.

Figure 9:
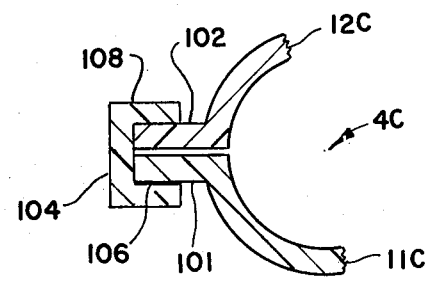
FIG. 9 is a partial magnified view of still another mounting means for securing the first member relative to the second member.

FIG. 9 is a partial view of a third embodiment 4C for slidably mounting the first member 11C to a second member 12C. In this embodiment, each of the first and second members 11C and 12C are substantially identical to one another each having a slide 101 and 102 on both ends (only one end shown). A U-shaped member 104 is glued to the first member 11C by a glue layer 106 creating a groove between an outer arm 108 and the slide 101 of the first member 11C. Accordingly, the first and second members may be fashioned to be identical to one another with the groove element 104 added by a glueing, ultrasonic welding process or the like.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been described:
What is claimed is:
1. A device for holding a flexible document, comprising in combination:
   a first and a second member each having a substantially planar central region interposed between end regions;
   each of said end regions including a protrusion extending outwardly relative to said substantially planar central region;
   said substantially planar central region of said first and second members being transparent;
   slidable mounting means for mounting said first member relative to said second member with said protrusions defining end containers for receiving rolled portions of the flexible document and with said central regions protecting an intermediate portion of the flexible document; and
   said slideable mounting means extending along said protrusions of each said first and second members enabling said first member to be moved relative to said second member to expose the flexible document for marking thereon.
2. A device as set forth in claim 1, wherein said protrusions are semi-cylindrical and established to form substantially cylindrical end containers between said first and second members.
3. A device as set forth in claim 1, wherein one of said end regions includes an end planar region adjacent to said protrusion on the opposite side from said planar central region, and
   said slidable mounting means includes a groove cooperable with said end planar region.
4. A device as set forth in claim 3, wherein said end planar region is slidable within said groove for slidably mounting said first member relative to said second member.

5. A device as set forth in claim 1, wherein said end regions of said first member include end planar regions adjacent to said protrusions and on the opposite sides from said planar central region of said first member; and
each of said end regions of said second member includes grooves cooperable with said end planar regions of said first member.

6. A device as set forth in claim 5, wherein said grooves face said protrusions.

7. A device as set forth in claim 1, wherein said first and second members are identical to one another;
each of said members having one end region comprising an end planar region adjacent to said protrusion and on the opposite side from said planar central region; and
each of said members having the other end region comprising a groove cooperable with said end planar region of the other member for slidably mounting said first member to said second member.

8. A device as set forth in claim 6, wherein each of said members is a unitary structure.

9. A device as set forth in claim 1, wherein each of said first and second members is a unitary transparent plastic structure.

10. A device as set forth in claim 1, wherein each of said end containers has an open cylindrical end for enabling rotation of the rolled portions of the flexible document to index the flexible document relative to said planar central region.

11. A device as set forth in claim 1, wherein at least a part of the lateral edge of said first and second members are rounded to enable insertion of the flexible document therebetween.

12. A device as set forth in claim 1, wherein
movement of said first member relative to said second member and the flexible document exposes a first side of the document for marking thereon; and
the movement of said second member relative to said first member and the flexible document exposes a second side of the document for marking thereon.

13. A device as set forth in claim 1, including
first and second logarithmic scales on said first and second members respectively for enabling slide rule calculation upon movement of said first member relative to said second member.

14. A device as set forth in claim 1, wherein said first and second members are transparent plastic structures; and
transparent plastic indicator means securable to one of said first and second members.

15. A device as set forth in claim 14, wherein said transparent plastic indicator means is securable to said first and second members by electrostatic attraction.

16. A device as set forth in claim 15, wherein said transparent plastic indicator means is a compass dial.

17. A device as set forth in claim 15, wherein said transparent plastic indicator means is a distance scale.

* * * * *